(12) United States Patent
Harstad

(10) Patent No.: US 10,726,476 B2
(45) Date of Patent: Jul. 28, 2020

(54) SYSTEMS AND METHODS FOR ADVANCED AUCTION MANAGEMENT

(71) Applicant: Ronald M. Harstad, Columbia, MO (US)

(72) Inventor: Ronald M. Harstad, Columbia, MO (US)

(*) Notice: Subject to any disclaimer, the term of this patent is extended or adjusted under 35 U.S.C. 154(b) by 259 days.

(21) Appl. No.: 15/933,703

(22) Filed: Mar. 23, 2018

(65) Prior Publication Data

US 2019/0295154 A1    Sep. 26, 2019

(51) Int. Cl.
*G06Q 30/06* (2012.01)
*G06Q 30/08* (2012.01)
*G06Q 30/02* (2012.01)

(52) U.S. Cl.
CPC ......... *G06Q 30/08* (2013.01); *G06Q 30/0283* (2013.01)

(58) Field of Classification Search
CPC ............................ G06Q 30/08; G06Q 30/0283
USPC ....................................................... 705/26.3
See application file for complete search history.

(56) References Cited

U.S. PATENT DOCUMENTS

| | | | |
|---|---|---|---|
| 7,058,602 B1 | 6/2006 | La Mura et al. | |
| 7,251,630 B1 | 7/2007 | Gupta et al. | |
| 7,409,360 B1 * | 8/2008 | Lark | G06Q 30/08 705/26.3 |
| 7,409,368 B2 * | 8/2008 | Hogendoorn | G06Q 40/04 705/37 |
| 2006/0200401 A1 | 9/2006 | Lisani et al. | |
| 2009/0006242 A1 * | 1/2009 | Adjali | G06Q 30/08 705/37 |
| 2010/0070586 A1 * | 3/2010 | Lawrence | H04L 67/02 709/206 |
| 2014/0025407 A1 * | 1/2014 | Hayek | G06Q 30/08 705/5 |
| 2014/0304048 A1 | 10/2014 | Asselin-Normand | |
| 2015/0379625 A1 | 12/2015 | Soldati | |

OTHER PUBLICATIONS

2014-U43129, Nov. 2014, Derwent, Dorr R C.*

* cited by examiner

*Primary Examiner* — Yogesh C Garg
(74) *Attorney, Agent, or Firm* — Armstrong Teasdale LLP

(57) ABSTRACT

A computer system for managing an auction system configured to (a) transmit a starting asset price for an auction asset to the plurality of bidder computer devices; (b) monitor the plurality of bidder computer devices to detect a first accept response; (c) if a first accept response is detected, (i) determine which bidder computer device of the plurality of bidder computer devices transmitted the first accept response and set the corresponding bidder as a first bidder; (ii) transmit a reduced asset price for the auction asset to the plurality of bidder computer devices; (iii) monitor the plurality of bidder computer devices to detect a second accept response; and (iv) if a second accept response is detected, set the current reduced asset price as a final asset price.

20 Claims, 6 Drawing Sheets ns and methods for managing an auction system and, more particularly, a network-based system of coordinating on-line bids for an over-descending auction.

SYSTEMS AND METHODS FOR ADVANCED AUCTION MANAGEMENT

FIELD OF THE INVENTION

The present disclosure relates to systems and methods for managing an auction system and, more particularly, a network-based system of coordinating on-line bids for an over-descending auction.

BACKGROUND

Dynamically-pricing auctions (often called "English auctions") are usually conducted with ascending prices, continuing until bidders cease competing over the available supply. These auctions are good choices for some occasions, but can take time, reveal information that a bid-taker may prefer not to disclose, and be more susceptible to collusion by a subset of bidders than alternative auction forms.

Flower and fish auctions in the Netherlands (called "Dutch auctions") publicly display prices descendingly, and transact more rapidly than any other auction format. As the first bidder to click a "buy" button ends the auction at that price, no information is revealed during the price-descending phase. When rational bidding stems from asymmetric valuations; however, the Dutch auction is predicted to yield inefficient outcomes—awarding the asset to one bidder when another values it more highly—with sometimes unacceptable frequency. In even simple settings, moreover, the rational bid (price level at which to click "buy") often requires an exceedingly difficult calculation (in particular, relative to the English auction), which might discourage bidder participation.

In many situations seeking to sell or to purchase assets via auction, it would be desirable to approach the speed of a Dutch auction, to sell to the bidder with the highest valuation even in circumstances where valuations are asymmetric, to prevent information revelation during the auction, to encourage bidder participation via simple rational bid functions, and to avoid facilitating collusion.

BRIEF SUMMARY

In one aspect, a computer system for managing an auction system is provided. The computer system includes at least one processor in communication with at least one memory device. The at least one processor is programmed to transmit a starting asset price for an auction asset to the plurality of bidder computer devices and monitor the plurality of bidder computer devices to detect a first accept response. If a first accept response is not detected, the at least one processor is also programmed to transmit a reduced asset price for the auction asset to the plurality of bidder computer devices and continue to monitor the plurality of bidder computer devices to detect a first accept response. If a first accept response is detected, the at least one processor is further programmed to determine which bidder computer device of the plurality of bidder computer devices transmitted the first accept response and set the corresponding bidder as a first bidder, transmit a reduced asset price for the auction asset to the plurality of bidder computer devices, and monitor the plurality of bidder computer devices to detect a second accept response. If the second accept response is not detected, the at least one processor is also programmed to transmit a reduced asset price for the auction asset to the plurality of bidder computer devices and continue to monitor the plurality of bidder computer devices to detect a second accept response. If the second accept response is detected, the at least one processor is further programmed to set the current reduced asset price as a final asset price. The computer system may have additional, less, or alternate functionality, including that discussed elsewhere herein.

In another aspect, a computer-implemented method for computer-implemented method for managing an auction system is provided. The method is implemented on a computer system including at least one processor in communication with at least one memory device. The method includes transmitting a starting asset price for an auction asset to the plurality of bidder computer devices and monitoring, by the at least one processor, the plurality of bidder computer devices to detect a first accept response. If a first accept response is not detected, the method also includes transmitting a reduced asset price for the auction asset to the plurality of bidder computer devices and continuing to monitor, by the at least one processor, the plurality of bidder computer devices to detect a first accept response. If a first accept response is detected, the method further includes determining, by the at least one processor, which bidder computer device of the plurality of bidder computer devices transmitted the first accept response and setting the corresponding bidder as a first bidder, transmitting a reduced asset price for the auction asset to the plurality of bidder computer devices, and monitoring, by the at least one processor, the plurality of bidder computer devices to detect a second accept response. If the second accept response is not detected, the method also includes transmitting a reduced asset price for the auction asset to the plurality of bidder computer devices and continuing to monitor, by the at least one processor, the plurality of bidder computer devices to detect a second accept response. If the second accept response is detected, the method further includes setting the current reduced asset price as a final asset price. The method may have additional, less, or alternate functionality, including that discussed elsewhere herein.

In at least one further aspect, at least one non-transitory computer-readable storage media having computer-executable instructions embodied thereon may be provided. When executed by at least one processor, the computer-executable instructions may cause the processor to transmit a starting asset price for an auction asset to the plurality of bidder computer devices and monitor the plurality of bidder computer devices to detect a first accept response. If a first accept response is not detected, the computer-executable instructions also cause the processor to transmit a reduced asset price for the auction asset to the plurality of bidder computer devices and continue to monitor the plurality of bidder computer devices to detect a first accept response. If a first accept response is detected, the computer-executable instructions further cause the processor to determine which bidder computer device of the plurality of bidder computer devices transmitted the first accept response and set the corresponding bidder as a first bidder, transmit a reduced asset price for the auction asset to the plurality of bidder computer devices, and monitor the plurality of bidder computer devices to detect a second accept response. If the second accept response is not detected, the computer-executable instructions also cause the processor to transmit a reduced asset price for the auction asset to the plurality of bidder computer devices and continue to monitor the plurality of bidder computer devices to detect a second accept response. If the second accept response is detected, the computer-executable instructions may cause the processor to set the current reduced asset price as a final asset price. The computer-executable instructions may have additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
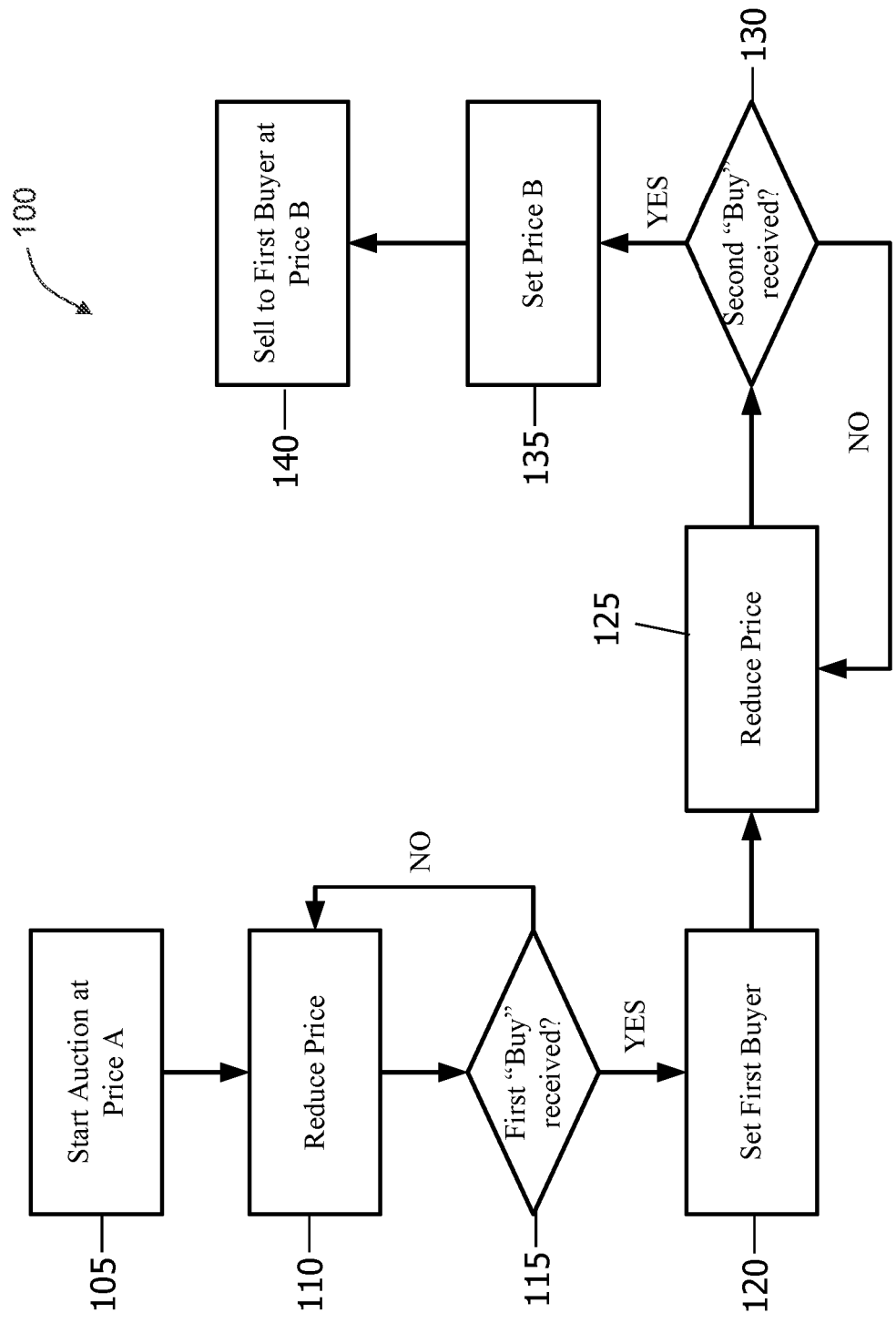
FIG. 1 illustrates a flow chart of an exemplary process of managing an over-descending auction, in accordance with one aspect of the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for model-based analysis of damage to a vehicle and estimating a cost to repair the vehicle. In one exemplary embodiment, the process may be performed by a bidding management ("BM") computer device. In the exemplary embodiment, the BM computer device may be in communication with a user computer device, such as a mobile computer device, and a plurality of bidder computer devices, such as additional mobile computer devices and/or computer terminals.

The Over-Descending Auction makes one highly critical change to Dutch auction rules. In the Dutch auction, prices are "called out" (signaled electronically from the BM computer device to bidders via bidder computer devices) in a descending sequence. However, while the first bidder to click "buy" on their bidder computer device will still obtain the asset, the remaining bidders will not be informed that a bidder has clicked, and the price will continue to decrease. The price at which the second bidder clicks "buy" becomes the price paid by that bidder who clicked first. The fundamental feature is that the price at which a bidder clicks may determine whether or not that bidder acquires the asset, but does not determine the price that bidder will pay if he or she wins; the price is instead determined by the behavior of competitors. Further variants with these characteristics are also described below.

In some auctions, the bid-taker (who is typically the seller, an agent working for the seller, or an auctioneer to whom the seller has consigned the asset) seeks to sell a single asset via an auction. Some auction forms have each bidder submit a bid (e.g., via a computer linkage) simultaneously with all rival bidders. These are called "sealed-bid" auctions.

Other auctions have a dynamic aspect, with bidders repeatedly considering what to do as prices change. For example, the "English" auction starts at a low enough price so that several bidders are willing to pay (thus demand exceeds supply, which throughout equals 1). As the price rises (via auctioneer calls, or via increasing prices being shown on bidders' computer screens), bidders reach their limits, and exit; thus, demand decreases. When one of the last two bidders ceases competing, demand is for the first time equal to supply, and the auction is over.

The Dutch auction, by contrast, starts at a price so high that no bidder is willing to pay it; thus supply (which is 1) exceeds demand (which is 0). The price decreases rapidly (in all auctions known to me, either by a "clock" moving backwards to lower prices, or by the current price shown on bidders' computer screens decreasing by a chosen increment at regular short time increments). Thus, the first bidder to accept a price sets demand equal to supply, and buys at the selected price. As the first act by a bidder ends the auction, a Dutch auction strongly economizes on time expended, often just a few seconds.

If the price in an English auction is increasing by $25 increments, and at $550 two bidders are still competing, but at $575 one has ceased to compete, the remaining bidder has won. That winning bidder's behavior did not determine the $575 final price; rather it was determined by the last of his rivals being willing to pay $550 but not $575. So this aspect, price determination by a losing bidder, is what leads auction scholars to label the English auction "incentive-compatible." Incentive-compatible auctions attain allocative efficiency (selling to the bidder who values the asset most highly) under far wider conditions on the nature of asset valuations and on bidders' information than auctions failing to be incentive-compatible.

The Dutch auction sells one asset by starting at too high a price, and decreasing prices till one bidder stops the auction by indicating his willingness to buy at that price. Thus, the winning bidder determines the price by his or her own behavior. The Dutch auction is thus not incentive-compatible; only under quite unrealistic assumptions can it be assured that the winning bidder will be the highest-valuing bidder.

The Over-Descending Auction corrects this allocative deficiency by continuing to have the price decrease after the first bidder has clicked to privately identify himself or herself as the winning bidder. No other bidder sees any change: the price continues to fall, and the information that one bidder has already clicked is not provided. When the second bidder accepts a price, that is, indicates willingness to buy at that price, this determines the price paid by the winning bidder. Thus, like the English auction, the Over-Descending Auction is incentive-compatible: the price paid by the winning bidder is determined not by his or her behavior, but by the behavior of his or her most competitive rival, the bidder who was second-highest to accept a price. The Over-Descending Auction attains allocative efficiency under the same assumptions as needed for the English auction.

The Over-Descending Auction lasts only slightly longer than the Dutch auction, just long enough for one more bidder to accept a price. With more than three bidders, the Over-Descending Auction will take notably less time than an English auction.

It might at first appear as if the Over-Descending Auction, by selling at the second-highest price a bidder is willing to pay, (that is, a price which two bidders are willing to buy) will in expectation raise less revenue than the Dutch auction. This is fallacious, as a bidder who knows that he will not have to pay the price he accepts (in the Over-Descending Auction) will accept a higher price than he would in a Dutch auction.

The Over-Descending Auction shares with the Dutch auction the property that no information about the behavior of rival bidders is revealed during the course of the auction. The information about the prices at which rival bidders cease competing that may become available during an ascending price auction could be of assistance to a subset of bidders who are colluding.

Included in this application are closely related variants. First, where N identical assets are for sale in the same dynamic auction, and the rules call for no bidder to win more than one asset (or the asset is such that a second asset would be valueless to any bidder), the Over-Descending Auction calls for the price to continue until N+1 bidders have clicked to indicate their willingness to pay the then-current price. In this case, the price at which the N+1 st bidder clicks becomes the sale price at which the N bidders clicking higher each acquire one asset.

In some situations, the seller or auctioneer will derive useful information from learning the prices at which more than one losing bidder would be willing to buy. One example would be that the seller has access to two further nearly identical assets, unavailable at this time, but that could be sold at two future auctions. In this case, the seller could announce in advance this variant: The price could continue to fall (with no information released) until a 4th bidder clicked to indicate a willingness to buy at the price clicked. It was known in advance that the first bidder to click would win, the second bidder to click would set the price. Now some information about prices future assets might fetch is provided by the 3rd and 4th prices clicked on by (further) losing bidders. Another example might be in an economics laboratory experiment, wherein each of the N bidders' prices might be useful data, still with the highest bidder winning and paying the highest price deemed acceptable to a losing bidder.

Consider a procurement auction, held by a buyer seeking to purchase on asset from one of several bidders seeking the contract to supply it. Procurements are often acquired via such an auction. In the procurement case, the auction corresponding to an English auction again begins with a price at which there are excess bidders, which in this case means starting at a high price, and then reducing the price as bidders unwilling to fulfill the contract at any lower price cease competing. This mirrors the usual English auction, as the price reached in the auction is determined by the last exit by a losing bidder, attaining incentive compatibility. A procurement auction corresponding to a Dutch auction would also reverse direction, starting at a price so low that no bidder is willing to supply. The price rises, stopping as soon as one supplier is willing. Thus, like a Dutch auction, the Dutch procurement auction is not incentive compatible, in that the price is determined by the winning bidder.

This application also introduces the Over-Ascending Procurement Auction. Mirroring the Over-Descending Auction, the Over-Ascending Procurement Auction starts with a price so low that no bidder is willing to supply, and raises the price rapidly. The first bidder to click "sell" becomes the winning bidder (winning supplier), and the price continues to rise without revealing to the other bidders that a bidder has clicked. The second bidder to click ends the auction and sets the price at which the lowest bidder sells. The Over-Ascending Procurement Auction mirrors the advantages of the Over-Descending Auction: it is fast, is incentive-compatible, finds the lowest-cost supplier in a wide variety of circumstances, and avoids revealing information during the auction, making it less susceptible to collusion by a subset of the bidders.

Algorithm Example

Suppose N bidders participate in an over-descending auction seeking to buy a single, indivisible asset. For this basic algorithm, assume that information about the prices at which bidders other than the top two bidders are willing to buy is not deemed useful (every extension or adjustment mentioned herein can be handled with a few straightforward changes in this algorithm). Inputs to the algorithm are L, an array, N+1 dimensions of identifiers of the bidders (with the last dimension eventually identifying the winning bidder); a minimum price $P_m \geq 0$; a starting price $P_s > P_m$; a variable H, with H==A indicating that price declines will be arithmetic, or H==Z indicating that price declines will be proportional; G>0, the gap (in half-seconds) between displaying a price and displaying the next price; and a variable W, for Width, the size of the gap between successively "announced" prices.

Bidders are seated at visually isolated computer terminals (or some combination of computer terminals and smart devices). Variable initializations: The variable C, current price, is set equal to $P_s$. Each element of the N-dimensional array B, for bidder status, is set equal to 0. The variables $P_F$, final price, D, number of demanders, and S, whether sold, are set equal to 0.

After showing instructions, and giving bidders a warning and a countdown, C is displayed on all bidders' screens, with a clickable "Buy" button available to each bidder.

For each bidder J who clicks "Buy" within G half-seconds, set that bidder's status B(J)=C, and D=D+1. [i] If D==1, set L(N+1) equal to the J for which B(J)=C, and set S=1. [ii] If D>1, the auction ends, set T=D, S=1 and $P_F$=C. Set X=1, Y=0. Draw V randomly from {1, ..., T}, equiprobably. While Y<T: if B(X)==C, set Y=Y+1; if Y==V, set L(N+1)=X; set X=X+1.

If the auction has not ended, if H==A, set C=C−W; if H==Z, set C=W*C. If C<$P_m$: the auction ends, if D==1, set $P_F$=$P_m$. Else, display C on all bidders' screens, with a clickable "Buy" button. If S==0, report to bidders that the item was not sold.

If S==1, if any bidder J clicks "Buy" within G half-seconds, set that bidder's status B(J)=C, set $P_F$=C; the auction ends.

After the auction, if S==1, report $P_F$, the final price; report L(J) for J=L(N+1), the identity of the winning bidder. If S==0, report "No bidder was willing to pay the minimum price".

The methods and systems described herein may be implemented using computer programming or engineering techniques including computer software, firmware, hardware, or any combination or subset therefor. At least one of the technical problems addressed by this system includes: (i) providing auction bidding systems with private/secret bids; (ii) preventing collusion in auction bidding; (iii) preventing information about the bidders and their bidding patterns from being revealed; (iv) simplifying the calculations made by the bidders to determine when to bid; and (v) encouraging bidder participation.

The technical effect of the systems and methods described herein is achieved by performing at least one of the following steps: (i) transmitting a starting asset price for an auction asset to the plurality of bidder computer devices; (ii) monitoring, by the at least one processor, the plurality of bidder computer devices to detect a first accept response (iii) if a first accept response is not detected, (a) transmitting a reduced asset price for the auction asset to the plurality of bidder computer devices and (b) continuing to monitor, by the at least one processor, the plurality of bidder computer devices to detect a first accept response; (iv) if a first accept response is detected, (a) determining, by the at least one processor, which bidder computer device of the plurality of bidder computer devices transmitted the first accept response and setting the corresponding bidder as a first bidder; (b) transmitting a reduced asset price for the auction asset to the plurality of bidder computer devices; and (c) monitoring, by the at least one processor, the plurality of bidder computer devices to detect a second accept response; (d) if the second accept response is not detected, (1) transmitting a reduced asset price for the auction asset to the plurality of bidder computer devices and (2) continuing to monitor, by the at least one processor, the plurality of bidder computer devices to detect a second accept response; (e) if the second accept response is detected, setting the current reduced asset price as a final asset price.

Exemplary Process for Managing an Over-Descending Auction

FIG. 1 illustrates a flow chart of an exemplary process 100 of managing an over-descending auction, in accordance with the present disclosure. In the exemplary embodiment, process 100 is performed by a bidding management ("BM") computer device associated with an auction provider. In other embodiments, process 100 is performed by the BM computer device in communication with an auction provider. In the exemplary embodiment, the BM computer device is in communication with a plurality of bidder computer devices. In this embodiment, the BM computer device transmits instructions to the plurality of bidder computer devices including information to display to the associated bidders. The BM computer device also receives information from the plurality of bidder computer devices, such as when a bidders places a bid or agrees to a price.

In the exemplary embodiment, the auction provider offers an asset for auction. While the exemplary embodiment describes a single asset, in other embodiments, multiple versions of the same asset may be offered.

In the exemplary embodiment, the BM computer device starts 105 the auction at Price A. The BM computer device transmits Price A to the plurality of bidder computer devices. The bidder computer devices then display the bid to their associated bidders.

The BM computer device reduces 110 the price of the asset. In the exemplary embodiment, the BM computer device reduces 110 the price a predetermined amount and after a predetermined amount of time. For example, the BM computer device may reduce the price by $1 every half a second. In the exemplary embodiment, the amount and speed of price reduction is set by the auction provider, potentially through the user computer device. The BM computer device transmits the updated price to the plurality of bidder computer devices and monitors 115 to see if any bidder has submitted a "Buy." In the exemplary embodiment, the bidder presses a "Buy" button on the corresponding bidder computer device. The bidder computer device then transmits an indication that the "Buy" button was pressed to the BM computer device. If no bidder has pressed the "Buy" button, the BM computer device continues to reduce 110 the price of the asset until a first "Buy" is received.

When the first "Buy" is received by the BM computer device, the BM computer device determines which bidder computer device transmitted the first "Buy". The BM computer device sets 120 the first buyer as the individual bidder that transmitted the first "Buy". The BM computer device continues to reduce 125 the price of the asset and transmit that reduced price to the plurality of bidder computer devices. The BM computer device monitors 130 for a second "Buy" from a different bidder computer device. When the BM computer device receives the second "Buy", the BM computer device sets 135 the price of the asset to the current reduced price of the asset (Price B).

In the exemplary embodiment, the BM computer device sells 140 or facilitates the sale of the asset to the first buyer at price B.

In summary, the auction begins and the price for the asset starts at Price A. The current price is sent to the plurality of bidder computer devices, which display the current price to their associated bidders. The price continues to reduce on a periodic basis until a first bidder clicks a button on their bidder computer device, indicating a desire to purchase the asset. The price continues to reduce until a second bidder clicks a button on their bidder computer device indicating a desire to purchase the asset. The price at the moment that the second bidder clicks is the final price for the asset. The first bidder is the winner of the auction. The first bidder would then be required to pay the final price to purchase the asset.

In some embodiments, there may be multiple assets. In these embodiments, where there are N assets, each of the first N bidders that clicks wins an asset and the N+1$^{st}$ click sets the price.

Exemplary Computer-Implemented Method for Managing an Over-Descending Auction

Figure 2:
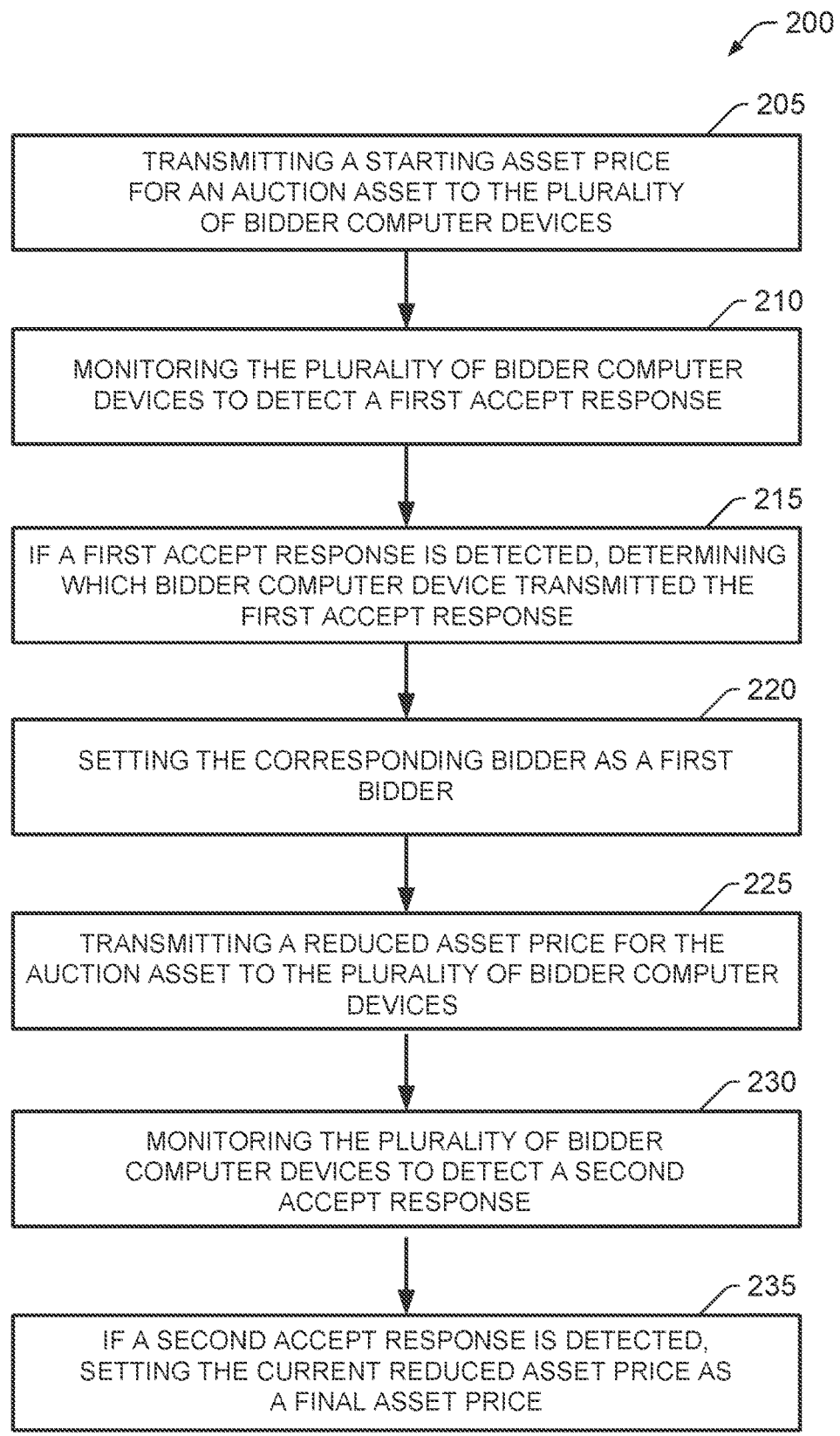
FIG. 2 illustrates a flow chart of an exemplary computer-implemented process for one aspect of the process of managing an over-descending auction as shown in FIG. 1, in accordance with one aspect of the present disclosure.

FIG. 2 illustrates a flow chart of an exemplary computer implemented process 200 for one aspect of process 100 for managing an over-descending auction as shown in FIG. 1. Process 200 may be implemented by a computing device, for example bidding monitoring ("BM") computer device 310 (shown in FIG. 3). In the exemplary embodiment, BM computer device 310 is in communication with a user computer device 325 (shown in FIG. 3) and a plurality of bidder computer devices 305 (shown in FIG. 3).

In the exemplary embodiment, BM computer device 310 stores a plurality of registration information linking a plurality of bidders to a plurality of bidder computer devices 305. This information may be stored in database 320 (shown in FIG. 3). The BM computer device 310 may receive the registration information from the bidders via their corresponding bidder computer devices 305. In some embodiment, the bidder computer devices 305 include a software application that allows them to communicate with and register with the BM computer device 310.

In the exemplary embodiment, BM computer device 310 transmits 205 a starting asset price for an auction asset to the plurality of bidder computer devices 305. BM computer device 310 monitors 210 the plurality of bidder computer devices 305 to detect a first accept response. Each of the plurality of bidder computer devices 305 are configured to display a current asset price to the associated bidder. Each bidder computer device 305 is further configured to receive an accept response from the corresponding bidder and transmit that response to the BM computer system 310. In some embodiments, the bidder may have a button to press to indicate the bidder's acceptance. The button may be a visual button displayed on a touch screen. The button may also be a button on a keyboard, such as the space key.

If a first accept response is not detected, BM computer device 310 continues to reduce the asset price and transmit the reduced asset price for the auction asset to the plurality of bidder computer devices 305. BM computer device 310 continues to monitor the plurality of bidder computer devices to detect a first accept response. In the exemplary embodiment, BM computer device 310 reduces the asset price a predetermined amount every period of time of predetermined length. For example, BM computer device 310 may reduce the price by $1 every half a second. In the exemplary embodiment, the predetermined amount and predetermined period of time is set by the auction provider, potentially through the user computer device 325.

If a first accept response is detected, BM computer device 310 determines 215 which bidder computer device 305 transmitted the first accept response. BM computer device 310 sets 220 the corresponding bidder as the first bidder. In some situations, two bidders may click the accept response almost simultaneously. In these situations, BM computer device 310 determines 215 which bidder accepted first. In some embodiments, the BM computer device 310 transmits a clock pulse or synchronizes clocks with all of the bidder computer devices 305 to determine timing and priority. In some embodiments, BM computer device 310 determines 215 which bidder was first based on the time of the bidder computer device 310. In other embodiments, BM computer device 310 determines 215 which was first based on the order that the bidder computer device's indication messages were received by the BM computer device 310. This may cause a situation where an individual bidder accepted first, but due to network issues their message was received second.

If there has been precisely one accept response, BM computer device 310 transmits 225 a further reduced asset price for the auction asset to the plurality of bidder computer devices 305. BM computer device 310 also monitors 230 the plurality of bidder computer devices 305 to detect a second accept response. If a second accept response is not detected, BM computer device 310 continues to reduce the asset price and transmit the reduced asset price for the auction asset to the plurality of bidder computer devices 305. BM computer device 310 continues to monitor the plurality of bidder computer devices to detect a second accept response.

If a second accept response is detected, BM computer device 310 sets the current reduced asset price as the final asset price. The first accept response and the second accept response must be received from different bidders. In the exemplary embodiment, the first response is received from a first bidder computer device 305 associated with the first bidder and the second accept response is received from a second bidder computer device 305 associated with the second bidder. In the exemplary embodiment, the second accept response may not be accepted from the first bidder. If the first bidder clicks twice, BM computer device 310 counts that as a single response at the time of the earlier click. As described above, BM computer device 310 may detect two accept responses in close succession. In these embodiments, BM computer device 310 counts the first response as the first accept response and the second response as the second accept response. In these embodiments, BM computer device 310 may not have reduced the asset price between the first accept response and the second accept response. In some embodiments, BM computer device 310 is configured to transmit a notification of the final price to the bidder computer device 305 associated with the first bidder.

In the exemplary embodiment, BM computer device 310 reduces the asset price until a first accept response is received. BM computer device 310 reduces the asset price until it reaches a predetermined minimum price. If the BM computer device 310 reaches the predetermined minimum price without receiving a first accept response, the auction ends without a sale. If the BM computer device 310 reaches the predetermined minimum price after receiving a first accept response, but no second accept response, the final asset price is set to the predetermined minimum price.

In some embodiments, the auction is for a number of assets N. In these embodiments, BM computer device 310 monitors the plurality of bidder computer devices 305 until a number of first accept responses are received equal to the number of assets. BM computer device 310 determines which bidder computer devices 305 of the plurality of bidder computer devices 305 transmitted the first accept responses and set each of the corresponding bidders as a first bidder. BM computer device 310 monitors for the second accept response after the number N of first accept responses are received. And BM computer device 310 sets the final asset price after a single second accept response is received (overall, the $N+1^{st}$ accept response) for all N assets equal to the current reduced asset price.

Exemplary Computer Network

Figure 3:
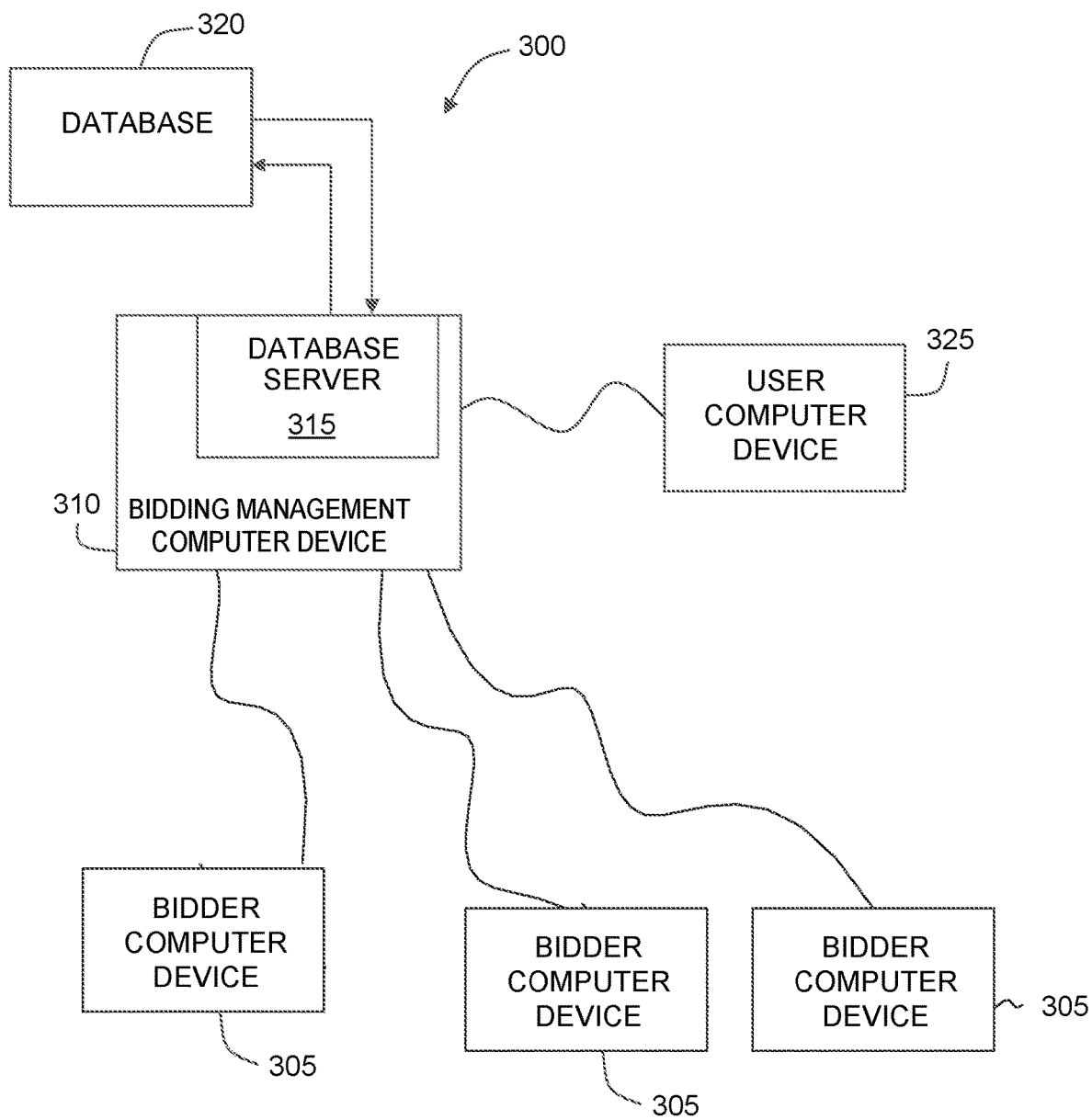
FIG. 3 illustrates a simplified block diagram of an exemplary computer system for implementing the processes shown in FIGS. 1 and 2.

FIG. 3 depicts a simplified block diagram of an exemplary computer system 300 for implementing processes 100 and 200 shown in FIGS. 1 and 2, respectively. In the exemplary embodiment, computer system 300 may be used for managing an auction and/or an auction system. As described below in more detail, a bidding monitoring ("BM") computer device 310 may be configured to (a) transmit a starting asset price for an auction asset, and then, reduced prices at pre-set times, to the plurality of bidder computer devices; (b) monitor the plurality of bidder computer devices to detect a first accept response; (c) if a first accept response is detected, (i) determine which bidder computer device of the plurality of bidder computer devices transmitted the first accept response and set the corresponding bidder as a first bidder; (ii) transmit a reduced asset price for the auction asset to the plurality of bidder computer devices; (iii) monitor the plurality of bidder computer devices to detect a second accept response; and (iv) if a second accept response is detected, set the current reduced asset price as a final asset price.

In the exemplary embodiment, user computer devices 325 are computers that include a web browser or a software application, which enables user computer devices 325 to access remote computer devices, such as BM computer device 310, using the Internet or other network. More specifically, user computer devices 325 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer devices 325 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

In the exemplary embodiment, bidder computer devices 305 are computers that include a web browser or a software application, which enables bidder computer devices 305 to access remote computer devices, such as BM computer device 310, using the Internet or other network. More specifically, bidder computer devices 305 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Bidder computer devices 305 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, bidder computer devices 305 execute an application to allow communication with the BM computer device 310 during the auction.

A database server 315 may be communicatively coupled to a database 320 that stores data. In one embodiment, database 320 may include auction information, bidder information, prices, and winning bidders. In the exemplary embodiment, database 320 may be stored remotely from BM computer device 310. In some embodiments, database 320 may be decentralized. In the exemplary embodiment, the user may access database 320 via user computer device 325 by logging onto BM computer device 310, as described herein.

BM computer device 310 may be communicatively coupled with one or more user computer devices 325 and one or more bidder computer devices 305. In some embodiments, BM computer device 310 may be associated with, or is part of a computer network associated with an auction provider, such as an auction house, or in communication with auction network computer devices. In other embodiments, BM computer device 310 may be associated with a third party and is merely in communication with the auction network computer devices. More specifically, BM computer device 310 is communicatively coupled to the Internet through any of many interfaces including, but not limited to, at least one of a network, such as the Internet, a local area network (LAN), a wide area network (WAN), or an integrated services digital network (ISDN), a dial-up-connection, a digital subscriber line (DSL), a cellular or satellite phone connection, and a cable modem.

BM computer device 310 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, BM computer device 310 hosts an application or website that allows users to access the functionality described herein. In some further embodiments, user computer device 325 and bidder computer devices 305 include an application that facilitates communication with BM computer device 310.

Exemplary Client Device

Figure 4:
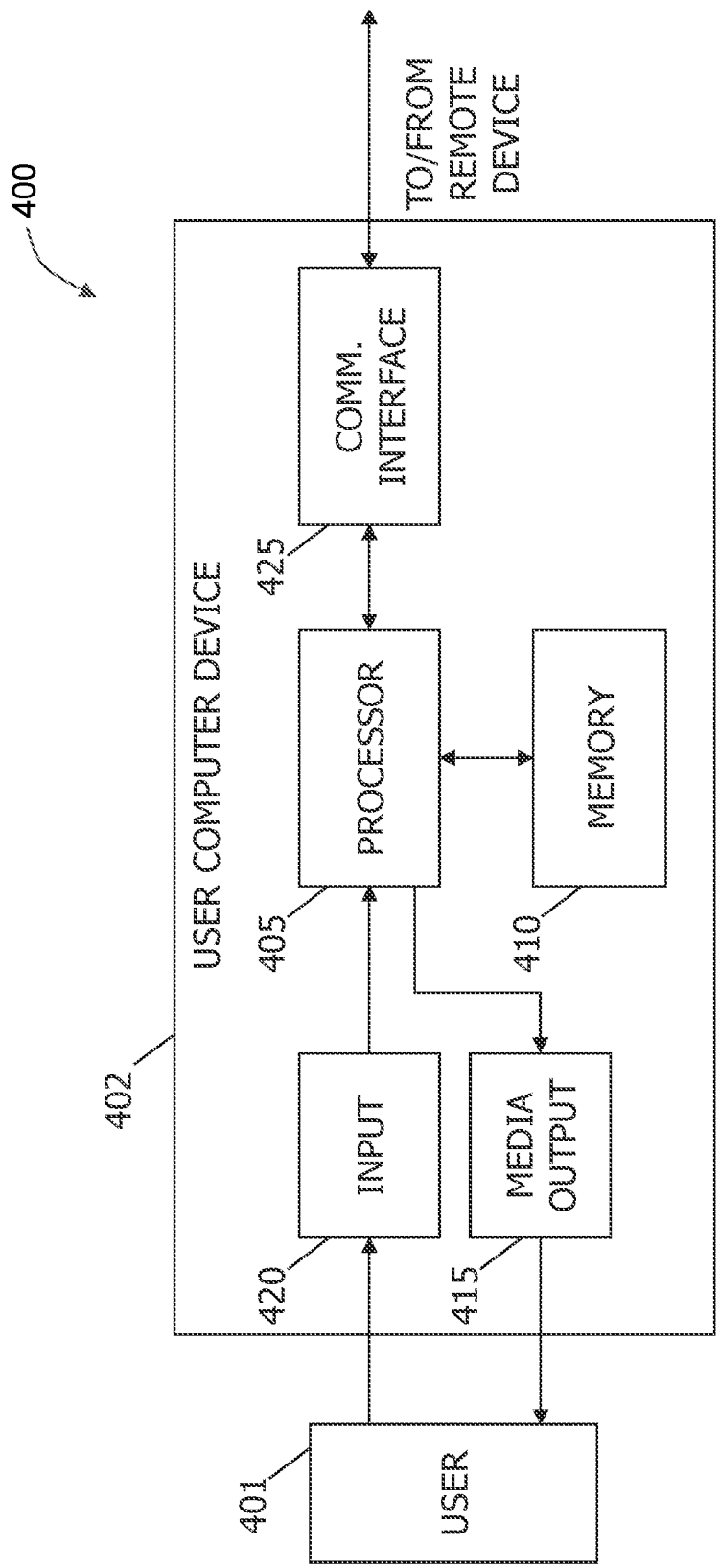
FIG. 4 illustrates an exemplary configuration of a user computer device, in accordance with one aspect of the present disclosure.

FIG. 4 depicts an exemplary configuration 400 of user computer device 402, in accordance with one embodiment of the present disclosure. In the exemplary embodiment, user computer device 402 may be similar to, or the same as, user computer device 325 (shown in FIG. 3). User computer device 402 may be operated by a user 401. User computer device 402 may include, but is not limited to, user computer devices 325 and bidder computer devices 305 (shown in FIG. 3). User computer device 402 may include a processor 405 for executing instructions. In some embodiments, executable instructions may be stored in a memory area 410. Processor 405 may include one or more processing units (e.g., in a multi-core configuration). Memory area 410 may be any device allowing information such as executable instructions and/or transaction data to be stored and retrieved. Memory area 410 may include one or more computer readable media.

User computer device 402 may also include at least one media output component 415 for presenting information to user 401. Media output component 415 may be any component capable of conveying information to user 401. In some embodiments, media output component 415 may include an output adapter (not shown) such as a video adapter and/or an audio adapter. An output adapter may be operatively coupled to processor 405 and operatively coupled to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 415 may be configured to present a graphical user interface (e.g., a web browser and/or a client application) to user 401. A graphical user interface may include, for example, an interface for viewing bids and auction information. In some embodiments, user computer device 402 may include an input device 420 for receiving input from user 401. User 401 may use input device 420 to, without limitation, select and/or enter one or more items of information about an auction.

Input device 420 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 415 and input device 420.

User computer device 402 may also include a communication interface 425, communicatively coupled to a remote device such as BM computer device 310 (shown in FIG. 4). Communication interface 425 may include, for example, a wired or wireless network adapter and/or a wireless data transceiver for use with a mobile telecommunications network.

Stored in memory area 410 are, for example, computer readable instructions for providing a user interface to user 401 via media output component 415 and, optionally, receiving and processing input from input device 420. A user interface may include, among other possibilities, a web browser and/or a client application. Web browsers enable users, such as user 401, to display and interact with media and other information typically embedded on a web page or a website from BM computer device 310. A client application may allow user 401 to interact with, for example, BM computer device 310. For example, instructions may be stored by a cloud service, and the output of the execution of the instructions sent to the media output component 415.

Exemplary Server Device

Figure 5:
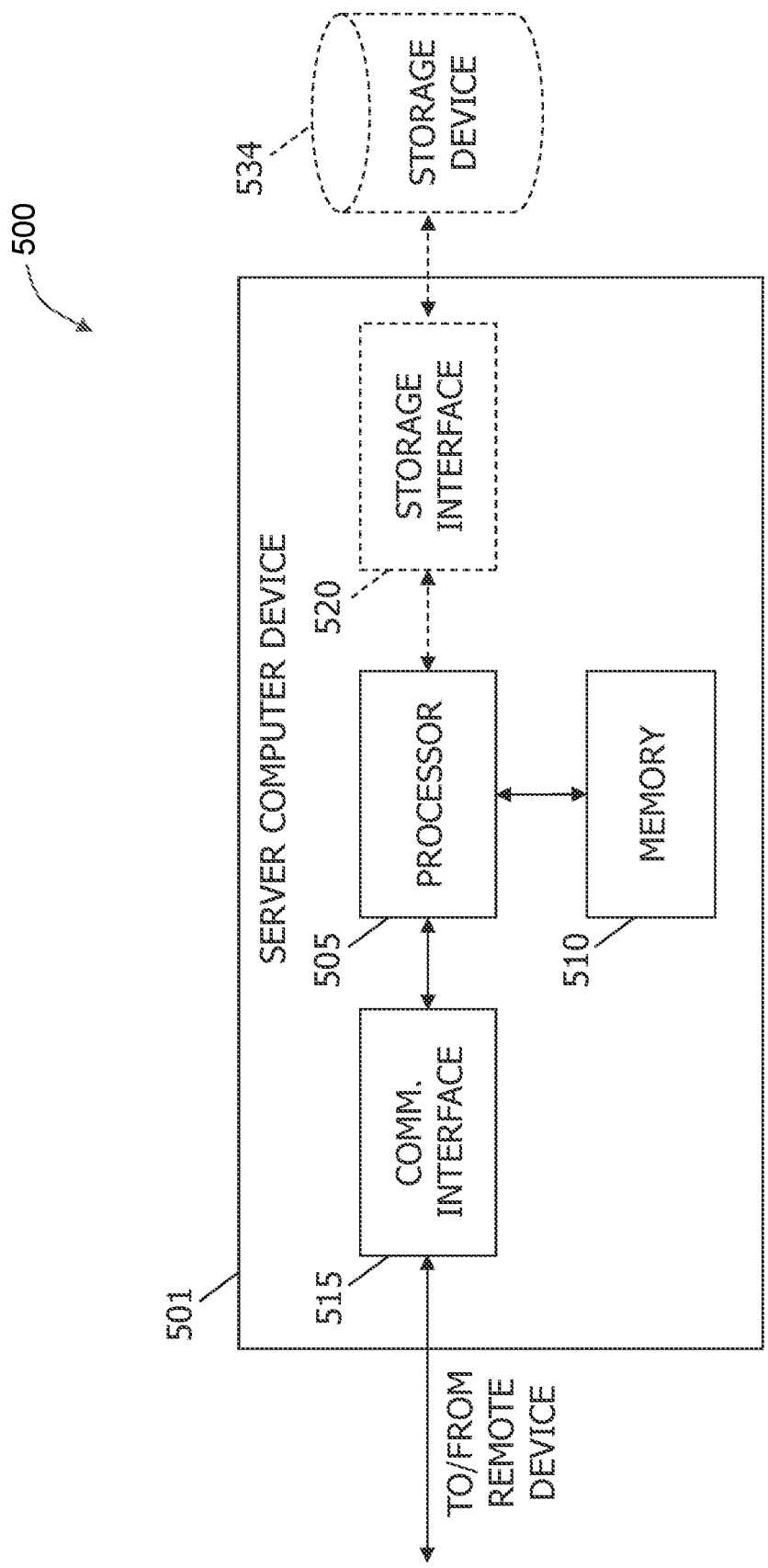
FIG. 5 illustrates an exemplary configuration of a server computer device, in accordance with one aspect of the present disclosure.

FIG. 5 depicts an exemplary configuration 500 of a server computer device 501, in accordance with one embodiment of the present disclosure. In the exemplary embodiment, server computer device 501 may be similar to, or the same as, BM computer device 310 (shown in FIG. 3). Server computer device 501 may include, but is not limited to, BM computer device 310 and database server 315 (shown in FIG. 3). Server computer device 501 may also include a processor 505 for executing instructions. Instructions may be stored in a memory area 510. Processor 505 may include one or more processing units (e.g., in a multi-core configuration).

Processor 505 may be operatively coupled to a communication interface 515 such that server computer device 501 is capable of communicating with a remote device such as another server computer device 501, BM computer device 310, bidder computer devices 305, and user computer devices 325 (both shown in FIG. 3) (for example, using wireless communication or data transmission over one or more radio links or digital communication channels). For example, communication interface 515 may receive requests from user computer devices 325 via the Internet, as illustrated in FIG. 3.

Processor 505 may also be operatively coupled to a storage device 534. Storage device 534 may be any computer-operated hardware suitable for storing and/or retrieving data, such as, but not limited to, data associated with database 320 (shown in FIG. 3). In some embodiments, storage device 534 may be integrated in server computer device 501. For example, server computer device 501 may include one or more hard disk drives as storage device 534.

In other embodiments, storage device 534 may be external to server computer device 501 and may be accessed by a plurality of server computer devices 501. For example, storage device 534 may include a storage area network (SAN), a network attached storage (NAS) system, and/or multiple storage units such as hard disks and/or solid-state disks in a redundant array of inexpensive disks (RAID) configuration.

In some embodiments, processor 505 may be operatively coupled to storage device 534 via a storage interface 520. Storage interface 520 may be any component capable of providing processor 505 with access to storage device 534. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 534.

Processor 505 may execute computer-executable instructions for implementing aspects of the disclosure. In some embodiments, the processor 505 may be transformed into a special purpose microprocessor by executing computer-executable instructions or by otherwise being programmed. For example, the processor 505 may be programmed with the instruction such as illustrated in Figures 1and 2.

Exemplary Computer Device

Figure 6:
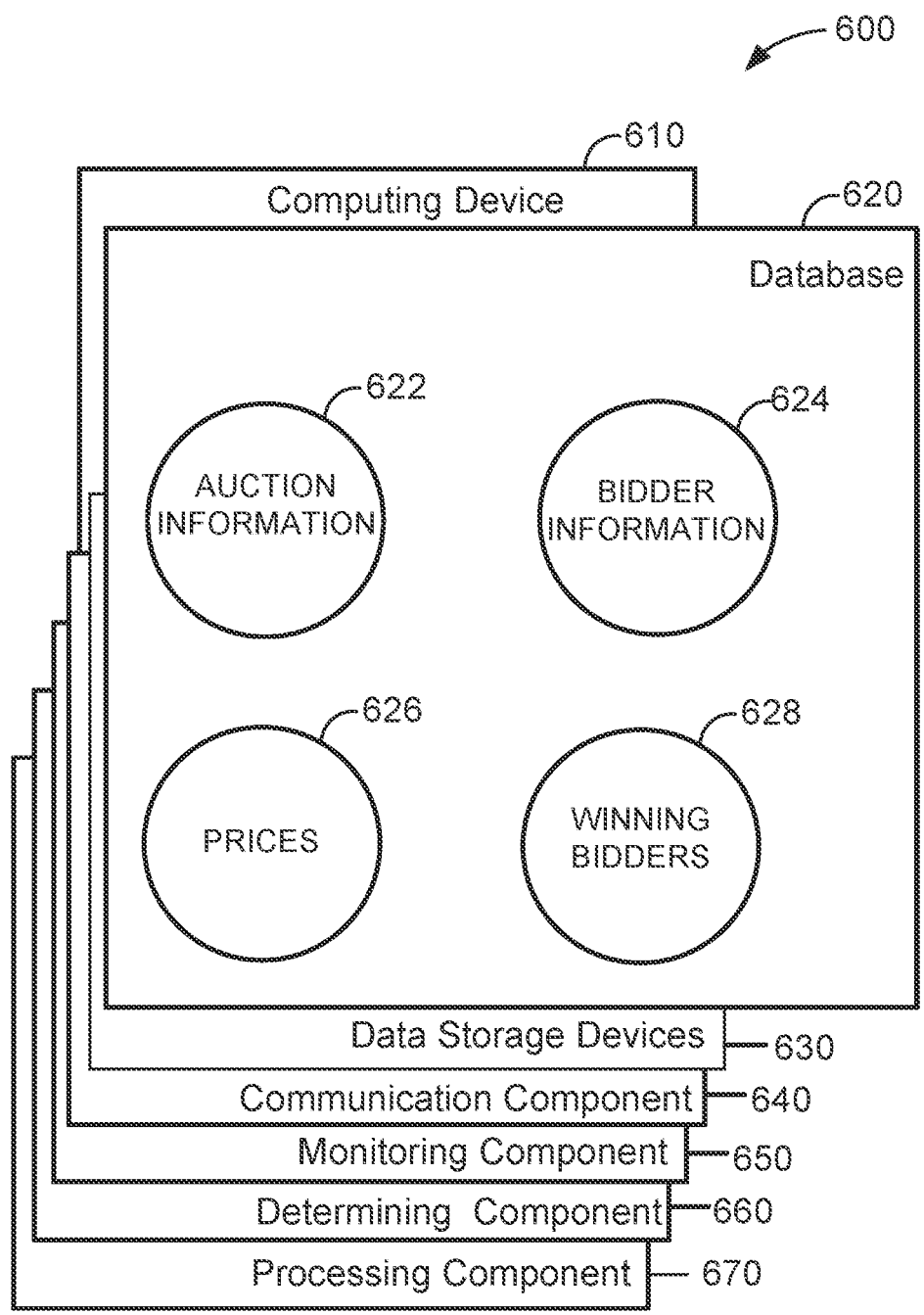
FIG. 6 illustrates a diagram of components of one or more exemplary computing devices that may be used in the system shown in FIG. 3.

FIG. 6 depicts a diagram 600 of components of one or more exemplary computing devices 610 that may be used in system 300 shown in FIG. 3. In some embodiments, computing device 610 may be similar to BM computer device 310. Database 620 may be coupled with several separate components within computing device 610, which perform specific tasks. In this embodiment, database 620 may include the auction information 622, bidder information 624, prices 626, and winning bidders 628. In some embodiments, database 620 is similar to database 320 (shown in FIG. 3).

Computing device 610 may include the database 620, as well as data storage devices 630. Computing device 610 may also include a communication component 640 for transmitting 205 a starting asset price and transmitting 225 a reduced asset price (both shown in FIG. 2). Computing device 610 may further include a monitoring component 650 for monitoring 210 and 230 the plurality of bidder computer devices (both shown in FIG. 2). Moreover, computing device 610 may include a determining component 660 for determining 220 which bidder computer device transmitted the first accept response (shown in FIG. 3). A processing component 670 may assist with execution of computer-executable instructions associated with the system.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above are examples only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only, and are thus not limiting as to the types of memory usable for storage of a computer program.

In another embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). In still yet a further embodiment, the system is run on Android® OS (Android is a registered trademark of Google, Inc. of Mountain View, Calif.). In another embodiment, the system is run on Linux® OS (Linux is a registered trademark of Linus Torvalds of Boston, Mass.). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independently and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

As used herein, the term "database" may refer to either a body of data, a relational database management system (RDBMS), or to both. As used herein, a database may include any collection of data including hierarchical databases, relational databases, flat file databases, object-relational databases, object-oriented databases, and any other structured or unstructured collection of records or data that is stored in a computer system. The above examples are not intended to limit in any way the definition and/or meaning of the term database. Examples of RDBMS's include, but are not limited to, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A computer system for managing an auction system, the computer system including at least one processor in communication with at least one memory device, the at least one processor is programmed to:

synchronize timing with a plurality of bidder computer devices to determine timing and priority of received accept responses from the plurality of bidder computer devices;

transmit starting asset price for an auction asset to the plurality of bidder computer devices;

monitor the plurality of bidder computer devices to detect a first accept response;

if the first accept response is not detected, the at least one processor is further programmed to transmit a reduced asset price for the auction asset to the plurality of bidder computer devices and continue to monitor the plurality of bidder computer devices to detect the first accept response; and if the first accept response is detected, the at least one processor is further programmed to:

determine which bidder computer device of the plurality of bidder computer devices transmitted the first accept response and set the corresponding bidder as a first bidder;

transmit a reduced asset price for the auction asset to the plurality of bidder computer devices;

monitor the plurality of bidder computer devices to detect a second accept response;

if the second accept response is not detected, the at least one processor is further programmed to transmit a reduced asset price for the auction asset to the plurality of bidder computer devices and continue to monitor the plurality of bidder computer devices to detect the second accept response; and if the second accept response is detected, the at least one processor is further programmed to set the current reduced asset price as a final asset price.

2. A computer system in accordance with claim 1, wherein the at least one processor is further programmed to store, in the at least one memory device, a plurality of registration information linking a plurality of bidders to a plurality of bidder computer devices.

3. A computer system in accordance with claim 1, wherein each of the plurality of bidder computer devices are configured to display a current asset price to the associated bidder, and wherein each bidder computer device is further configured to receive an accept response from the corresponding bidder and transmit that response to the computer system.

4. A computer system in accordance with claim 1, wherein the at least one processor is further configured to reduce the current asset price a predetermined amount on a predetermined period of time.

5. A computer system in accordance with claim 4, where the at least one processor is further configured to receive a plurality of auction settings from a user including the predetermined amount and the predetermined period of time.

6. A computer system in accordance with claim 1, wherein the auction is for a number of assets, and wherein the at least one processor is further configured to:
monitor the plurality of bidder computer devices until a number of first accept responses are received equal to the number of assets;
determine which bidder computer devices of the plurality of bidder computer devices transmitted the first accept responses and set each of the corresponding bidders as a first bidder;
monitor for the second accept response after the number of first accept responses are received; and
set the final asset price after one second accept response is received for the plurality of assets to the current reduced asset price.

7. A computer system in accordance with claim 1, wherein the at least one processor is further configured to transmit a notification of the final asset price to the bidder computer device associated with the first bidder.

8. A computer system in accordance with claim 1, wherein the at least one processor is further programmed to synchronize timing with the plurality of bidder computer devices by repeatedly transmitting a clock pulse to the plurality of bidder computer devices.

9. A computer-implemented method for managing an auction system, the method implemented on a computer system including at least one processor in communication with at least one memory device, the method comprising:
synchronize timing with a plurality of bidder computer devices to determine timing and priority of received accept responses from the plurality of bidder computer devices;
transmitting a starting asset price for an auction asset to the plurality of bidder computer devices;
monitoring, by the at least one processor, the plurality of bidder computer devices to detect a first accept response;
if the first accept response is not detected, the method further comprises transmitting a reduced asset price for the auction asset to the plurality of bidder computer devices and continuing to monitor, by the at least one processor, the plurality of bidder computer devices to detect the first accept response; and
if the first accept response is detected, the method further comprises:
determining, by the at least one processor, which bidder computer device of the plurality of bidder computer devices transmitted the first accept response and setting the corresponding bidder as a first bidder;

transmitting a reduced asset price for the auction asset to the plurality of bidder computer devices;
monitoring, by the at least one processor, the plurality of bidder computer devices to detect a second accept response;
if the second accept response is not detected, the method further comprises transmitting a reduced asset price for the auction asset to the plurality of bidder computer devices and continuing to monitor, by the at least one processor, the plurality of bidder computer devices to detect the second accept response; and
if the second accept response is detected, the method further comprises setting the current reduced asset price as a final asset price.

10. The method of claim 9 further comprising storing, in the at least one memory device, a plurality of registration information linking a plurality of bidders to a plurality of bidder computer devices.

11. The method of claim 9, wherein each of the plurality of bidder computer devices are configured to display a current asset price to the associated bidder, and wherein each bidder computer device is further configured to receive an accept response from the corresponding bidder and transmit that response to the computer system.

12. The method of claim 9 further comprising reducing the current asset price a predetermined amount on a predetermined period of time.

13. The method of claim 12 further comprising receiving a plurality of auction settings from a user including the predetermined amount and the predetermined period of time.

14. The method of claim 9, wherein the auction is for a number of assets, and wherein the method further comprises:
monitoring the plurality of bidder computer devices until a number of first accept responses are received equal to the number of assets;
determining which bidder computer devices of the plurality of bidder computer devices transmitted the first accept responses and set each of the corresponding bidders as a first bidder;
monitoring for the second accept response after the number of first accept responses are received; and
setting the final asset price after one second accept response is received for the plurality of assets to the current reduced asset price.

15. At least one non-transitory computer-readable storage media having computer-executable instructions embodied thereon, wherein when executed by a computer system comprising at least one processor in communication with at least one memory device, the computer-executable instructions cause the processor to:
synchronize timing with a plurality of bidder computer devices to determine timing and priority of received accept responses from the plurality of bidder computer devices;
transmit a starting asset price for an auction asset to the plurality of bidder computer devices;
monitor the plurality of bidder computer devices to detect a first accept response;
if the first accept response is not detected, the computer-executable instructions cause the processor to transmit a reduced asset price for the auction asset to the plurality of bidder computer devices and continue to monitor the plurality of bidder computer devices to detect the first accept response; and if the first accept response is detected, the computer-executable instructions cause the processor to:

determine which bidder computer device of the plurality of bidder computer devices transmitted the first accept response and set the corresponding bidder as a first bidder;

transmit a reduced asset price for the auction asset to the plurality of bidder computer devices;

monitor the plurality of bidder computer devices to detect a second accept response;

if the second accept response is not detected, the computer-executable instructions cause the processor to transmit a reduced asset price for the auction asset to the plurality of bidder computer devices and continue to monitor the plurality of bidder computer devices to detect the second accept response; and if the second accept response is detected, the computer-executable instructions cause the processor to set the current reduced asset price as a final asset price.

16. The computer-readable storage media of claim 15, wherein the computer-executable instructions further cause the processor to store, in the at least one memory device, a plurality of registration information linking a plurality of bidders to a plurality of bidder computer devices.

17. The computer-readable storage media of claim 15, wherein each of the plurality of bidder computer devices are configured to display a current asset price to the associated bidder, and wherein each bidder computer device is further configured to receive an accept response from the corresponding bidder and transmit that response to the computer system.

18. The computer-readable storage media of claim 15, wherein the computer-executable instructions further cause the processor to reduce the current asset price a predetermined amount on a predetermined period of time.

19. The computer-readable storage media of claim 18, wherein the computer-executable instructions further cause the processor to receive a plurality of auction settings from a user including the predetermined amount and the predetermined period of time.

20. The computer-readable storage media of claim 15, wherein the auction is for a number of assets, and wherein the computer-executable instructions further cause the processor to:

monitor the plurality of bidder computer devices until a number of first accept responses are received equal to the number of assets;

determine which bidder computer devices of the plurality of bidder computer devices transmitted the first accept responses and set each of the corresponding bidders as a first bidder;

monitor for the second accept response after the number of first accept responses are received; and set the final asset price after one second accept response is received for the plurality of assets to the current reduced asset price.

* * * * *